United States Patent [19]
Ferrigno

[11] 3,856,545
[45] Dec. 24, 1974

[54] PIGMENTARY COMPOSITION
[76] Inventor: Thomas Howard Ferrigno, 29 Clover Hill Cir., Trenton, N.J. 08638
[22] Filed: Nov. 15, 1972
[21] Appl. No.: 306,926

Related U.S. Application Data
[63] Continuation of Ser. No. 164,416, July 20, 1971, abandoned.

[52] U.S. Cl............................................ 106/288 B
[51] Int. Cl............................................. C08h 17/02
[58] Field of Search ................................ 106/288 B

[56] References Cited
UNITED STATES PATENTS
3,366,501   1/1968   Lamar............................ 106/288 B Primary Examiner—Delbert E. Gantz
Assistant Examiner—John P. Sheehan
Attorney, Agent, or Firm—Sperry and Zoda

[57] ABSTRACT

Comminuted anhydrous minerals are combined with inorganic binders and formed into agglomerates which, when calcined to cause fusion, contain internal voids and surfaces of minor porosity. The resulting compositions are useful in applications requiring high visible light reflectance.

11 Claims, No Drawings

PIGMENTARY COMPOSITION

This application is a continuation of my prior copending application, Ser. No. 164,416, dated July 20, 1971 now abandoned comprising the same subject matter.

FIELD OF INVENTION

Comminuted anhydrous minerals have refractive indexes about the same as most organic polymers, oils, waxes and the like used in many applications such as paints, plastics, adhesives, rubber and the like. When such particulate minerals are used as fillers in these compositions, they contribute very little opacity due to the relatively minor differences in refractive indexes. My invention involves the agglomeration of these particulate anhydrous minerals with suitable inorganic binders and calcining to consolidate the mass to obtain a surface of minor porosity and an interior containing voids and having reflecting surfaces. The resulting pigmentary compositions exhibit a specific gravity in the range of 60 to 95 percent of that of the anhydrous mineral of which it is composed, and substantially improved opacity. Because of their very high reflectances, my agglomerates may be substituted for all or a part of the white hiding pigment in the above-mentioned organic systems.

The pigmentary compositions of my invention exhibit a high degree of opacity even when immersed in media having a refractive index about the same as that of the anhydrous mineral used to make them. Since the effect of my composition is that of a white pigment, the connotation of pigmentary compositions is applied in the broader sense and does not imply that the size or shape of the product is limited except by the applications in which it is used. Thus, it has been found that mastics several centimeters thick may be given a white appearance by the inclusion of my pigmentary agglomerates having sizes as large as one centimeter or larger. Paint films of 50 microns thick may be made to have opacity and whiteness with only the inclusion of my agglomerates having dimensions averaging 20 to 30 microns.

OBJECT OF THE INVENTION

To produce highly light-reflecting pigmentary compositions from comminuted minerals which would ordinarily contribute very low reflectance when immersed in a medium of similar refractive index.

To produce a white appearing pigment from low refractive index minerals.

To improve the contribution to opacity of comminuted minerals used as fillers in paints, plastics, rubber and related compositions.

To produce white appearing pigments having lower densities than that of the predominating mineral of their composition.

These and other objects will be apparent from the description which follows.

PREFERRED EMBODIMENT OF THE PRESENT INVENTION

The general requisites of my invention are: 1) a comminuted anhydrous mineral, 2) an inorganic binder to bind the comminuted anhydrous mineral when forming agglomerates into the sizes and shapes suitable for a particular application, 3) a forming step to obtain an agglomerate of suitable size and shape and, 4) a calcining step to consolidate the agglomerate, to permanentize the bonds between the anhydrous mineral particles and to reduce the surface porosity thereof. The finished products of my invention are shiny, white articles having good attrition resistance. They also retain their white appearance when immersed in a medium of refractive index similar to that of the predominant mineral from which it is made whereas the predominating mineral would not appear to be white under the same conditions. In fact, under these conditions the comminuted anhydrous mineral virtually disappears when it is dispersed in a medium which matches its refractive index. My products also have densities lower than those of the anhydrous mineral from which they are made, and fall in the range of 60 percent to 95 percent of the density of the minerals from which they are made.

For clarity, each component, its concentration and each step of my invention will be described below.

THE ANHYDROUS MINERAL

The anhydrous mineral constitutes 90 to 99 percent of the final product by weight.

The following group lists minerals constituting ingredients adapted for use in this invention. Since they are derived from naturally occurring ores, they will normally be associated with other classes of minerals or contaminants. Certain contaminants may also be present as a result of subsequent processing to render them suitable for use in my invention. I have found that associated minerals or contaminants may constitute as much as about 10 percent of the anhydrous mineral without changing the nature of my pigmentary compositions. For my purposes then, the term substantially defines the anhydrous mineral silicates as that which contains at least about 90 percent by weight of the group consisting of: 1) silica, 2) alkali metal silicates consisting of berylium, magnesium and calcium silicates, 3) alumino silicates, 4) alkali alumino-silicates consisting of lithium, berylium, barium sodium, magnesium, calcium and potassium alumino-silicates and 5) mixtures thereof. Representative types are listed below with their chemically combined oxides as is general practice when refering to minerals.

| | |
|---|---|
| Albite | $Na_2O \cdot Al_2O_3 \cdot 6 SiO_2$ |
| Anorthite | $CaO \cdot Al_2O_3 \cdot SiO_2$ |
| Beryl | $3 BeO \cdot Al_2O_3 \cdot 6 SiO_2$ |
| Celsian | $BaO \cdot Al_2O_3 \cdot 2 SiO_2$ |
| Diopside | $CaO \cdot MgO \cdot 2 SiO_2$ |
| Enstatite | $MgO \cdot SiO_2$ |
| Fosterite | $2 MgO \cdot SiO_2$ |
| Gehlenite | $CaO \cdot MgO \cdot Al_2O_3 \cdot SiO_2$ |
| Grossularite | $3 CaO \cdot Al_2O_3 \cdot 3 SiO_2$ |
| Kaliophilite | $K_2O \cdot Al_2O_3 \cdot 2 SiO_2$ |
| Kyanite | $Al_2O_3 \cdot SiO_2$ |
| Leucite | $K_2O \cdot Al_2O_3 \cdot 4 SiO_2$ |
| Microcline | $K_2O \cdot Al_2O_3 \cdot 6 SiO_2$ |
| Monticellite | $CaO \cdot MgO \cdot SiO_2$ |
| Mullite | $3 Al_2O_3 \cdot 2 SiO_2$ |
| Nephelite | $K_2O \cdot 3 Na_2O \cdot 4 Al_2O_3 \cdot 9 SiO_2$ |
| Orthoclase | $K_2O \cdot Al_2O_3 \cdot 6 SiO_2$ |
| Petalite | $Li_2O \cdot Al_2O_3 \cdot 8 SiO_2$ |
| Phenacite | $2 BeO \cdot SiO_2$ |
| Silica | $SiO_2$ |
| Spodumene | $Li_2O \cdot Al_2O_3 \cdot 4 SiO_2$ |
| Tremolite | $CaO \cdot 3 MgO \cdot 3 SiO_2$ |
| Wollastonite | $CaO \cdot SiO_2$ |

This representative list provides a range of refractive indexes of from about 1.47 to about 1.74 and very low opacities when the comminuted minerals are dispersed in organic media having refractive indexes in this range. Their softening points are in the range of about 1000° C to about 1890° C.

Although I prefer to use feldspar, which is defined in "Dana's Manual of Mineralogy" - 18th Edition, by C. S. Hurlbut, John Wiley and Sons, Inc. (1971), at Page 459, as a mixture of orthoclase, albite and anorthite, it will become apparent from the description which follows that any of the above-listed minerals are suitable. It is only necessary that the calcining step be conducted in a manner sufficient to provide fusion of the comminuted anhydrous mineral particles to obtain an agglomerate having acceptably low surface porosity and sufficient hardness.

Anhydrous minerals have been found to be the most preferable for my invention since they are less subject to change of particle shape or interfering reactions during the calcining process than other minerals; particularly those containing water of crystallization. Many of the latter types distort, expand or shrink in the calcining process due to water loss. As such, the hydrous minerals tend to produce porous products not suitable as pigmentary compositions when the teachings of my invention are followed. Similarly, gas producing minerals, such as the carbonates, do not provide useful products when calcined. These effects are well known to those practicing mineralogy, ceramic and related arts.

For use in my invention the anhydrous mineral must be comminuted. Its upper particle-size limit depends only on the size of the agglomerate to be formed therefrom. Although I do not wish to be limited by specifying a particle-size for large agglomerates of, say, one centimeter or larger, it is obvious that smaller particles will provide greater numbers of internal reflecting surfaces and therefore greater opacity. An average particle-size of 100 microns or even larger is suitable for such large agglomerates.

The limiting minimum average particle-size is in the range of 2 microns, below which the average voids and void surfaces become too small to reflect light in the visible wave length spectrum. The result therefore is a severe reduction in the opacity of my pigmentary compositions. Complicating this effect is that of the inorganic binder which is required in greater concentration to bind finer, very high surface-area comminuted minerals. High concentrations of inorganic binder tend to reduce the void volumes between groups of particles and to severly reduce the opacity of my pigmentary compositions.

It is necessary to deal with average diameters of the mineral particles since, when they are comminuted, a wide range of particle sizes are obtained. It is common practice in the minerals industry to define this state as the point at which 50 percent by weight is either finer or coarser than the indicated equivalent spherical diameter. Methods of testing which report the largest dimension of the particles as the equivalent spherical diameter, such as sedimentation techniques, are generally held to be the most reliable descriptors and the meaning used here.

It is within the scope of this invention to use practically obtainable anhydrous minerals as either mined or processed products. Thus, the comminuted anhydrous mineral may be a suitable ore or one which has been subjected to bleaching, froth-flotation, calcining, water, acid or alkali washing, or to various other treatments before or after grinding or particle-size classification for my use. Certain hydrous minerals, such as talcs, clays and many others, may be calcined to a subtantially anhydrous condition (90 percent by weight or greater of the anhydrous mineral) for use. Such calcined products would then conform with the anhydrous mineral silicate classification given above and in the claims.

The only limitation found to apply to the anhydrous mineral, other than composition and particle-size, is that the pigmentary composition produced therefrom should have a visually white appearance. This condition will be described later.

THE INORGANIC BINDER

The purpose of the inorganic binder is multifold: 1) to provide a temporary bond between the anhydrous mineral particles so that the subsequent calcining step may be performed without loss of the desired shape or fracture of the formed agglomerate, 2) to help to provide a permanent bond between the particles of the agglomerate so that after calcining the pigmentary composition will retain its integrity in use, 3) to help to reduce the surface porosity of the pigmentary composition and thus to prevent intrusion of liquids or solids which would result in either reduced or no opacity improvement of my pigmentary compositions over the anhydrous minerals from which they are made, 4) to preserve the internal void volume of the pigmentary compositions by sealing particle junctures and to thus provide opacity improvement and 5) to regulate the void volume of the pigmentary composition.

Classes of suitable inorganic binders are:

Glassy phosphates

Sodium polyphosphates as described in U.S. Pat. No. 3,127,238 having 4 to 100 phosphorous atoms per molecule and preferably 13 to 100 phosphorous atoms per molecule.

Expanding lattice montmorillonites

This class of minerals is characterized by its ability to expand when mixed with water. The theoretical formula, members of the class and descriptive information are contained in the previously cited reference; "Dana's Manual of Mineralogy". I prefer to use white or pale colored bentonite containing 0.2 to 6 percent $Na_2O$ by weight.

Soluble silicates

Various alkali metal silicates of commerce are available with weight ratios of $SiO_2$ to $Na_2O$, for example, of from 1.60 to 1, to 3.75 to 1. Other alkali metals such as K or Li provide similar properties and ratios depend on the equivalent weight of the cation. As a class they are generally called soluble silicates although many form colloidal sols depending on the proportion of polymeric silica present. For my purposes all forms of solutions or dry powders are useful. Those having higher silica to alkali metal oxide ratios are preferred since these provide calcined products less sensitive to the effects of weather and water in certain applications.

The concentration of the inorganic binder of the dry materials will be in the range of 1 to 10 percent and preferably 1 to 6 percent by weight.

Although I prefer to use bentonite as the inorganic binder, I have not found distinctive differences in the listed classes. Under most conditions of use, the montmorillonites, and bentonite in particular, tend to bind the agglomerates slightly better and to thus stand the rigors of handling and the calcining steps with less damage to the agglomerates.

Agglomerate Formation

The preferred steps in fabricating the agglomerate are: 1) mixing the comminuted anhydrous mineral silicate and inorganic binder with sufficient water for processing, and 2) forming agglomerates of size and shape suited to a particular application.

Mixing and forming may be combined in one process. Spherical agglomerates can be made by spraying a solution or dispersion of the inorganic binder into the anhydrous mineral as it is fed to the pan of a rotating disc pelletizer. The same method can be applied to a drum tumbler.

Where mixing and forming are advantageously carried out in two steps, the needs of the forming step will determine the mixing method. If a tableting press is to be used, a relatively dry mix may be prepared in a ribbon blender, sigma blade mixer, tumbling barrel or the like. Such mixtures may be fed to compacting rolls, extruders or the like for subsequent forming of the compacts or for calcining in the form obtained. Spray-drying requires a fluid dispersion of the ingredients which is made in suitable batch or continuous fluid mixing equipment for later feeding to the spray dryer.

In terms of the water-free ingredients dried to equilibrium at 100°C., the dry ingredients will make up from about 30 to 95 percent by weight of the mixture for forming, the remaining being water.

The shape of the agglomerate is chosen according to the particular application. Spheriods are generally the most versatile because of their minimum surface area, minimum abrasiveness, flowability, more predictable packing arrangements, ease of size-grading and maximum compressive strength. Other shapes would be more suitable for certain artistic or design features. Ovate section discs, rods, tetrahedra or any of a number of polyhedra would be suitable depending on the packing arrangement, optical effect or mechanical disposition desired for my pigmentary compositions. The agglomerates preferably range in size from about 20 microns to one centimeter depending upon the purpose for which they are to be used.

Methods of forming are too varied to be mentioned here, but it is apparent that the method used should provide a compact or agglomerate having sufficient integrity to withstand handling prior to calcining and to preserve the approximate configuration desired of the final calcined product.

Calcining

Calcining consolidates the agglomerate by bonding the anhydrous mineral particles in conjunction with the inorganic binder to yield a structure having low surface porosity with internal voids. Under ideal conditions the agglomerate would be heated very rapidly to a temperature at which the surface would melt and the interior would just bond. In practice, I have found that there is a great latitude in the time and temperature to which the agglomerates may be exposed while still maintaining the most desirable characteristics of my products. The only limiting factor I have found is the melting point of the anhydrous mineral. When feldspar is used it is usual to carry out the calcining operation at a temperature of about 1100°F to 1200°F for a period of about 5 to 15 minutes. Although the binder helps to reduce the bonding temperature, higher melting minerals require the use of temperatures adequate to cause bonding. Combinations of anhydrous minerals are advantageously employed to reduce bonding temperatures to those of the lower melting types. The time-temperature relationship is then to be understood as being limited only to that necessary to obtain the properties of the products as stipulated in the claims.

Very little distortion or shrinkage of the agglomerates takes place on calcining. Other than a glazing effect on the surface, I have noted that many of the agglomerates yield pigmentary compositions of virtually the same dimensions after calcining.

Methods of calcining may be chosen according to the size of the agglomerate. Large agglomerates may be calcined statically, in a rotary, fixed hearth and rake, rotating hearth or any of a number of types of furnaces. Smaller agglomerates are preferably calcined in fluid-bed furnaces wherein heated gases fluidize the bed so that they do not fuse to each other to an objectionable extent. It is obvious that the calcining step should be conducted so that agglomerates are either separated or agitated to reduce or prevent the fusion of one to another.

It is within the scope of my invention to modify the calcining conditions by the use of oxidizing or reducing atmospheres or the inclusion of hydrogas in the furnace atmosphere to promote fusion or to otherwise alter my pigmentary compositions within the scope of the claims.

The Pigmentary Compositions

The primary property of my pigmentary compositions and the basis for my invention lies with the discovery of the improvement of the opacity of low refractive index anhydrous minerals. When a low refractive index comminuted mineral is uniformly surrounded by a transparent medium of similar refractive index, the mixture appears to the eye as a single transparent or nearly transparent phase. However, when the same low refractive index mineral is made into my pigmentary compositions and are dispersed in the same manner, they are visible as white or nearly white pigmentary, opaque articles. The effect obtained with my products is due to the many internal void-mineral interfaces. According to the laws of optics, particles reflect light in proportion to the differences in refractive index between the particles and the surrounding medium. Therefore, particles having about the same refractive index as the surrounding medium reflect little light and provide equally little opacity. If, as in my products, the particles are even partially surrounded by voids having a refractive index of 1, then the difference between that of the mineral and that of the void causes a considerable increase in the reflectance and opacity.

Not wishing to be limited to theoretical considerations, I have further discovered that the sufficiency of this effect can be characterized by density or specific gravity determination. Thus, if the density of the anhydrous mineral is, say 2.64, I have found that the density of my pigmentary composition made therefrom should be at most about 95 percent thereof, or about 2.51. Greater density reduction results in greater opacity as would be expected from the increased number of void-particle interfaces. Certain comminuted anhydrous minerals which pack poorly yield densities for my pigmentary compositions as low as 60 percent of that of the parent mineral. In many applications, it is preferable to obtain a fairly high degree of hardness and resistance to attrition and therefore a density in the range of 80 to 95 percent of that of the parent anhydrous mineral silicate. It should be noted that for reasons of simplicity and because of their low concentrations, the inorganic binder has been neglected in these calculations.

Any standard method may be used for determining density or specific gravity, although I prefer to use water displacement methods utilizing a pycnometer for the comminuted anhydrous mineral and the same equipment or a displacement balance for my pigmentary compositions which yield value as specific gravity.

A certain degree of porosity of the pigmentary compositions is not objectionable provided, of course, that the specific gravity is reduced to at least 95 percent of that of the anhydrous mineral of the composition. For most purposes, and especially where maximum opacity improvement is desired, I find that a porosity measured by equilibrium water absorption should not exceed about 10 percent by weight of the pigmentary composition, that is, 100 grams of my products should not absorb water in excess of about 10 grams. Where a minimum absorption of liquids is preferred, as in paints where absorption of the liquid vehicle may cause undesirable high viscosities, the water absorption should be below about 5 percent.

In regard to the whiteness of my products, the variety of sizes and shapes are not amenable to uniform criteria of reflectance measurement. I therefore prefer to use as a method for comparison my pigmentary compositions placed upon a white, opaque structure having a reflectance of about 84 percent at 550 millimicrons, the average wave-length of visible light, versus a freshly prepared MgO standard taken as 100 percent. Such a standard is prevalent in the paint industry for a reflectance above which surfaces appear white to the average viewer. Thus, several coats of a white semi-gloss enamel on a suitable surface to render the structure opaque, and having a reflectance of 84 percent as above, is a suitable standard. Most of my pigmentary compositions appear to be brilliantly white when placed on such a background. Any of a number of photometric instruments for measuring reflectance are suitable for establishing the reflectance values under the above conditions.

The following examples illustrate the invention and are not intended to restrict or limit the scope or manner in which the invention may be practiced.

EXAMPLE 1

In this through Example 7, a feldspar was used which consisted of a natural mixture of albite, orthoclase and anorthite. The blasted pegmatite dike was crushed in a jaw crusher, ground in a water-fed rod mill to minus 20 mesh (U.S. standard sieve designation) and then subjected to froth-flotation to remove mica, garnet anad silica to the extent that these impurities represented less than about 2 percent. After drying in a rotary furnace, the mineral was ground in an air-swept pebble mill and collected in a cyclone separator. The product had an average particle size of 11 microns, a specific gravity of 2.64 and an average refractive index of 1.53. The powdered mineral was also visually bright white.

Also common to Examples 1 through 6 is the manner of agglomerate preparation. In each case the binder was added to the comminuted mineral as a solution or dispersion in water and sufficient water was added, if required, with mixing to obtain a plastic mixture which could be rolled by hand into 1 to 5 mm beads. The formed beads were then dried in a convection oven at 115°C prior to calcining.

In all examples the ingredient proportions are given in parts by weight.

A mixture of 96 parts feldspar and 4 parts "Glass H" with between 24 and 26 parts water was formed into beads. Glass H is a tradename of FMC Corporation for a glassy sodium polyphosphate having an average of 21 phosphorous atoms per molecule as described in U.S. Pat. No. 3,127,238. The formed and dried beads were placed without touching each other in an electrically heated laboratory tube furnace equipped with a pyrometer having a 1°C precision. Due to the size of the furnace the temperature varied to some extent, therefore an average was taken for the maximum temperature for the period of time indicated in the table. After the indicated period, heating was stopped and the furnace and its contents were allowed to cool to ambient temperature.

Specific gravity was determined by water displacement after soaking the beads in distilled water for 30 minutes. Water absorption was then determined by removing the excess water by lightly rolling the beads on a paper towel and weighing for comparison with the original dry weight for the specific gravity test.

Example 1

| | | | | | |
|---|---|---|---|---|---|
| Feldspar | 96 parts | | | | |
| "Glass H" | 4 parts | | | | |
| Experiment No. | | 27-2 | 27-2 | 34-3 | 34-3 |
| Calcining Minutes | | 13 | 13 | 6 | 6 |
| Temperature, C | | 1121 | 1127 | 1160 | 1127 |
| Water Absorption, % | | 0 | 3.0 | 0 | 0 |
| Specific gravity | | 2.36 | 2.64 | 2.50 | 2.25 |
| Opacity | | opaque | nil | opaque | opaque |
| Sp. Gr. reduction, % | | 7 | 0 | 5 | 15 |

The data for Example 1 indicate that the fusion process is time-temperature dependent. It may be noted that experiment 27-2 beads calcined for 13 minutes at 1127° C completely collapsed and fused to an unsatisfactory surface cracks and a specific gravity equal to that of the anhydrous mineral. The water absorption apparently was due to the water imbibed by the surface fissures. The remaining data indicate that either a lower temperature for the same 13 minutes, or equal or higher temperatures for a shorter time (6 minutes) results in products having the desired opacity when dispersed in either mineral oil or tricresyl phosphate having refractive indexes of 1.48 and 1.55 respectively which are slightly above and below that of the feldspar at 1.53. When the same feldspar is dispersed in these liquids it appears as an almost clear, single phase with virtually no opacity. The data for opacity in the examples was obtained using this method.

The reduction in specific gravity was calculated by taking the difference between the bead and felspar specific gravities and dividing by the felspar specific gravity × 100 for percent. It may be seen that a reduction of 5 percent in specific gravity provided complete opacity.

EXAMPLE 2

In this example a white refined bentonite having an Na$_2$O content of 0.2 percent, tradenamed "Bentolite L" by Georgia Kaolin Co., was used in order to promote the swelling of bentonite more completely, the Na₂O content was adjusted with sodium carbonate. Although the Bentolite L would have been an effective binder without adjustment, the addition of soluble alkali hastens and more completely expands the crystal lattice. On drying, the swollen bentonite shrinks and forms strong bonds between the anhydrous mineral particles which have little affinity for or bonding to each other.

Example 2

| Experiment No. | 33-1 | | 33-4 | | 44-4 | | 44-5 | |
|---|---|---|---|---|---|---|---|---|
| Feldspar | 96 | | 96 | | 97 | | 96 | |
| "Bentolite L" | 4 | | 4 | | 3 | | 4 | |
| Water | 25 | | 31 | | 29 | | 29 | |
| Na₂O Con./ | | | | | | | | |
| "Bentolite L", % | 2 | | 4 | | 4 | | 5 | |
| Calcining: | | | | | | | | |
| Minutes | 6 | 6 | 6 | 6 | 13 | 13 | 13 | 13 |
| Temp. C | 1160 | 1127 | 1160 | 1127 | 1127 | 1138 | 1127 | 1138 |
| Water abs.,% | 0 | 12 | 0 | 12 | 0 | 0 | 1.7 | 0 |
| Specific Gr. | 2.66 | 2.4 | 2.67 | 2.1 | 2.33 | 2.29 | 2.27 | 2.31 |
| Opacity* | G | 0 | G | 0 | 0 | 0 | 0 | 0 |
| Specific gr. reduction,% | 0 | 9 | 0 | 20 | 12 | 13 | 14 | 12 |

*G=glassy, O=opaque

In preparing the binder, the Bentolite L was first dispersed in hot water in a high-shear mixer to obtain 10 to 15 percent Bentolite L of the total weight. Dry sodium carbonate was then added with mixing to adjust the Na₂O content of the Bentolite L to the values given.

Short periods at high temperatures again caused the beads to collapse to glassy, transluscent or transparent masses having specific gravities very nearly or equal to the specific gravity of the feldspar; experiments 33-1 and 33-4, 6 minutes at 1160° C. Experiments 33-1 and 33-4, calcined 6 minutes at 1127° C provided adequate specific gravity reductions, but slightly high water absorptions. Experiments 44-4 and 44-5 provided the most desirable properties.

EXAMPLE 3

Two types of sodium silicate were used in this example to illustrate the similarity of bead properties obtainable with another type of binder. Both "N Brand" and "S-35 Brand" are water-containing liquid products of Philadelphia Quartz Co., differing in their Na₂O/SiO₂ ratios by weight: 1 to 3.22 and 1 to 3.75, and in their total solids by weight: 38.6 and 32.1 percent respectively. Both experiments utilized 4 percent sodium silicate solids of the total solids. It may be seen that the properties obtained were similar to those of the beads made with the other binders.

Example 3

| Experiment No. | 44-2 | | 44-3 | |
|---|---|---|---|---|
| Feldspar | 96 | | 96 | |
| "N Brand" | 10.6 | | — | |
| "S-35 Brand" | — | | 12.5 | |
| Water | 20 | | 20 | |
| Calcining: | | | | |
| Minutes | 13 | 13 | 13 | 13 |
| Temp. C | 1127 | 1121 | 1127 | 1121 |
| Water Abs.,% | 0 | 0 | 1 | 0 |
| Specific gr. | 2.31 | 2.22 | 2.33 | 2.28 |
| Opacity | all smooth and opaque | | | |
| Specific Gr. Reduction, % | 13 | 16 | 12 | 14 |

EXAMPLE 4

In this example, Glass H at two percent of the total solids provided adequate bonding of the agglomerate for processing purposes and satisfactory bead properties when calcined under conditions similar to the preceeding examples.

Example 4

| Experiment No. | 34-4 | | 44-6 | |
|---|---|---|---|---|
| Feldspar | 98 | | 98 | |
| "Glass H" | 2 | | 2 | |
| Water | 25 | | 26 | |
| Calcining: | | | | |
| Minutes | 6 | 6 | 13 | 13 |
| Temp., C. | 1160 | 1127 | 1121 | 1127 |
| Water abs.,% | 0 | 5.3 | 1.7 | 0 |
| Specific gr. | 2.3 | 2.4 | 2.4 | 2.31 |
| Opacity | all smooth and opaque | | | |
| Specific gr. Reduction, % | 13 | 9 | 9 | 13 |

EXAMPLE 5

Mixtures of minerals were used in this example to illustrate the effects of naturally-occurring or synthesized mixtures. The silica used was natural quartz ground to an average particlesize of 10 microns, having a specific gravity of 2.65 and a melting point of 1722°C. As such, this silica does not differ significantly from other high-temperature melting anhydrous minerals for puposes of illustration.

Experiment 52-2 provided bead having high porosity since the time and temperature of calcination were inadequate to promote sufficient fusion of the mineral. It is apparent from previous examples that the time-temperature relationship will be a function of the mineral composition of the agglomerate. As proof of this, experiments 55-1 and 55-3 were conducted using silica and felspar with different binders and subjecting the beads to a slightly higher temperature for a longer period. These last two experiments provided beads having fully satisfactory properties.

EXAMPLE 6

To determine the usefulness of the calcined beads in applications where weathering or severe hydrolytic environments are concerned, the tests reported in the following tables were conducted.

Example 5

| Experiment No. | 52-2 | 55-1 | 55-3 |
|---|---|---|---|
| Feldspar | — | 48.5 | 49 |
| Silica | 97 | 48.5 | 49 |
| "Bentolite L", 4% | | | |
| $Na_2O$ Content | 3 | 3. | — |
| "Glass H" | — | — | 2 |
| Water | 33 | 31. | 27 |
| Calcining: | | | |
| Minutes | 20 | 27 | 27 |
| Temp. C | 1116 | 1135 | 1135 |
| Water abs.,% | 22 | 2.5 | 0 |
| Specific gravity | 2.28 | 2.20 | 2.20 |
| Opacity | translucent | opaque | opaque |
| Specific gr. reduction, % | 14 | 17 | 17 |

Example 6

| Experiment No. | 27-2 | 27-3 |
|---|---|---|
| Feldspar | 96 | 98 |
| "Glass H" | 4 | — |
| "N Brand" | — | 5.4 |
| Water | 24 | 26 |
| Calcining: | | |
| Minutes | 5 | 5 |
| Temp., C | 1150 | 1150 |
| Water absorption, 4 days in distilled water, % | 0.59 | 2.66 |
| Beads boiled 30 minutes in distilled water and redried, boiling loss, % | 0.24 | 0 |

Typical examples of my pigmentary compositions were selected for water soaking and boiling tests. It may be noted that although experiment 27-2 beads exhibited very low ambient water absorption (0.59 percent), they did incur 0.24 percent loss in the boiling water test. Experiment 27-3 beads, exhibiting 2.66 percent ambient water absorption, nevertheless lost no weight when boiled. Both effects are well within the range of suitability for applications where my pigmentary compositions would be used.

EXAMPLE 7

A dispersion of 20 lb of feldspar, 1.09 lb of N Brand sodium silicate and 10.3 lb of water was made to yield a total solids concentration of 65 percent. The solids consisted of 98 percent feldspar and 2 percent sodium silicate. The fluid dispersion was spray-dried in a Bowen Engineering Inc. semiworks spray-dryer by pumping through a spray nozzle of the co-current type with atomizing air at 70 psi. The heated air inlet temperature was 232°C and the outlet air carrying the evaporated water was about 107°C. The feed rate of the dispersion was 1.1 lb per minute. The chamber product yield was 70 percent of the total solids fed in the ten minutes run and consisted essentially of completely dried spheriods. The cyclone product constituted the remaining 30 percent of the solids and was substantially dry powder. The chamber product had very good resistance to attrition and was sieved to obtain fractions of plus 100 and minus 80 mesh (149 to 177 microns) and plus 325 and minus 200 mesh (44 to 74 microns). Both fractions were calcined by placing porous ceramic batts with thin layers of spheriods thereon in a muffle furnace at 1138°C. After 7 minutes the batts and spheriods were removed and allowed to cool at ambient temperature.

The calcined spheriods were dispersed in mineral oil having a refractive index of 1.48 at 25°C for comparison with a dispersion of similar concentration of the feldspar. All three dispersions were viewed without aid and at 50 magnifications with incident and transmitted light. The minus 80, plus 100 mesh spheriods were by all methods of viewing substantially opaque. Incident light revealed a white-appearing dispersion whereas transmitted light revealed a predominance of opaque spheroids. The minus 200, plus 325 mesh fraction provided moderate visual opacity and 50 magnifications revealed that a substantial proportion was completely fused and glassy. The comminuted feldspar was completely transparent in the oil dispersion by all methods.

Water absorption of the minus 80, plus 100 mesh calcined spheroids was very difficult to determine owing to the capillary effect of the mass of spheroids but was determined to be about 7 percent. The specific gravity was 2.42 and therefore a reduction of about 8 percent was obtained for the spheroids versus the specific gravity of the feldspar.

My pigmentary compositions are useful in many applications where whiteness is desired and especially where white opacifying pigments, such as titanium dioxide, are used. Paints, caulks, adhesives, elastomers and many types of plastics all benefit where more costly white opacifying pigments may be replaced or substantially replaced. My pigmentary compositions also may be used as light reflectors and, due to the many shapes possible, also provide ornamentation. By using them as highly efficient reflectors to replace granules adhered to asphalt saturated felt roofing, as overlapping discs for example, they would prevent actinic radiation from embrittling the asphalt. Concrete and other cast structures would be reflectorized and given spalling protection by lining forms with my pigmentary compositions temporarily adhered to a supporting sheet so that the supporting sheet may be removed later to leave the pigmentary compositions embedded in the surface of the structure.

My products may be mixed with a variety of binders, both liquid and solid, for application to or in a wide variety of structures which may be heated, pressed, dried or otherwise processed. Thus, castings, potting compounds, joint fillers, rotomolded plastics items, mastics and pressed laminates all may be benefited.

Whereas comminuted anhydrous minerals, from which my products are made, have relatively high surface areas per unit weight compared with those of my products, it is apparent that surface treatments are more easily accomplished and lower concentrations of treating agents may be used. Organosilane or other coupling or bonding agents thus may be used to ensure more intimate bonding of the matrix or adherand to my products.

It is also within the scope of this invention to add high refractive index modifiers to my compositions to achieve specific optical effects. The ultimate in opacity thus may be achieved by including zinc oxide, titanium dioxide, zirconia or other white opacifiers.

Processing of my compositions also may be modified by the inclusion of appropriate concentrations of plasticity-aiding agents such as the phyllosilicates, of which kaolin and talc are prominant members, and the amphibole group of inosilicates. Calcining and fusing conditions also may be modified by the use of various fluxing agents prior to or after the agglomerate forming step.

Suitable agents include those yielding $K_2O$, $Na_2O$, $CaO$, $B_2O_3$, $PbO$, $ZnO$ alone and in combination.

In some instances it is desirable to add small or trace amounts (1 percent or less) of ceramic stains (blue, violet) to the material to improve the reflectance and white appearance of the finished product while increasing its opacity.

Further, it is also possible to use minor amounts of inorganic dispersants such as polyphosphates to aid in the processing steps or to add flocculating or thixotropic agents, such as $Ca(OH)_2$ or $Al(OH)_3$ to improve the structure or improve the spacing of the particles in the agglomerates and aid in the removal of water during the calcining operation. Usually such agents are used in amounts not exceeding about 0.5 percent of the solid matter which is not volatilized during calcining.

In some instances antimony compounds or the like may be added to reduce or eliminate the effects of iron or other contaminants in the mineral, such as iron oxide, which might otherwise cause undesirable staining or discoloration of the product. However, when desired coloring agents such as colbalt, manganese, cadmium, and various metal oxides may be incorporated in the product to produce pigments of various desired colors.

It is evident from the above that my pigmentary compositions are extremely versatile materials as well as being amenable to various modifications which even further extend their versatility.

I claim:

1. A white appearing pigmentary composition comprising calcined agglomerates consisting of from about 90 to 99 parts by weight of anhydrous silicates selected from the group consisting of silica, the silicates of berylium, magnesium and calcium, aluminosilicates, the alumino-silicates of lithium, berylium, magnesium, barium, sodium, potassium and calcium; and mixtures thereof; 1 to 10 parts by weight of an inorganic binder selected from the group consisting of glassy sodium polyphospates having from about 4 to 100 phosphorous atoms per molecule, expanding lattice montmorillonites, soluble silicates of sodium, potassium and lithium, and mixtures thereof, said anhydrous silicates consisting of particles having an average size ranging from about 2 to 40 microns and said agglomerates ranging in size from about 20 microns to 1 centimeter.

2. A white appearing pigmentary composition as defined in claim 1 wherein said agglomerates are characterized by a specific gravity of from about 60 to 95 percent of that of the anhydrous silicate contained therein and a water absorption not exceeding 10 percent of the weight of the agglomerate.

3. A white appearing pigmentary composition as defined in claim 1 wherein said anhydrous silicate is feldspar.

4. A white appearing pigmentary composition as defined in claim 1 wherein said anhydrous silicate is a mixture of silica and feldspar.

5. A white appearing pigmentary composition comprising calcined agglomerates having a size of from about 20 microns to one centimeter and containing about 94 to 99 parts by weight of feldspar in the form of particles having an average size ranging from about 2 to 40 microns, bonded together by about 1 to 6 parts by weight of a sodium polyphosphate having an average of from about 4 to 100 phosphorous atoms per molecule, said agglomerates having a specific gravity about 5 to 20 percent lower than that of the feldspar contained therein.

6. A white appearing pigmentary composition comprising calcined agglomerates having a size of from about 20 microns to one centimeter and containing about 94 to 99 parts by weight of feldspar in the form of particles having an average size of about 2 to 40 microns, bonded together by about 1 to 6 parts by weight of expanding lattice montmorillonite, said agglomerates having a specific gravity about 5 to 20 percent lower than that of the feldspar contained therein and having a water absorption less than about 5 percent by weight.

7. A white appearing pigmentary composition comprising calcined agglomerates having a size of from about 20 microns to one centimeter and containing about 94 to 99 parts by weight of feldspar in the form of particles having an average size of from about 2 to 40 microns bonded together by about 1 to 6 parts by weight of a soluble silicate, said agglomerates having a specific gravity about 5 to 20 percent lower than that of the feldspar contained therein and a water absorption less than about 5 percent by weight.

8. A method of producing a white appearing pigmentary composition which comprises mixing together about 90 to 99 parts by weight of anhydrous silicate having an average particle size of about 2 to 40 microns, with from about 1 to 10 parts by weight of inorganic binder selected from the group consisting of glassy sodium polyphosphate having from about 4 to 100 phorphorous atoms per molecule, expanding lattice montmorillonites, and the soluble silicates of sodium, potassium and lithium and mixtures thereof, and forming water, forming said mixture into agglomerates having an average size ranging from about 20 microns to 1 centimeter, and thereafter calcining said agglomerates at a temperature sufficient to bond the particles of anhydrous silicate together and form a product composed of calcined agglomerates chractertized by a specific gravity of from about 60 to 95 percent of that of the anhydrous silicate and a water absorption of less than 10 percent by weight.

9. A method as defined in claim 8 wherein said anhydrous silicate is selected from the group consisting of silica; the silicates of berylium, magnesium, and calcium; alumino-silicate; the alumino-silicates of lithium, berylium, magnesium, barium, sodium, potassium, and calcium; and mixtures thereof.

10. A method as defined in claim 8 wherein said anhydrous silicate is feldspar and said inorganic binder is expanding lattice montmorillonite.

11. A method as defined in claim 8 wherein said anhydrous silicate is a mixture of silica and feldspar, and said inorganic binder is expanding lattice montmorillonite.

* * * * *